United States Patent [19]

Crumrine et al.

[11] 4,057,502
[45] Nov. 8, 1977

[54] SEAL FOR CARTRIDGE-TYPE FILTER ASSEMBLIES

[75] Inventors: Albert W. Crumrine, Peoria; Lawrence F. Fratzke, East Peoria, both of Ill.

[73] Assignee: Caterpillar Tractor Co., Peoria, Ill.

[21] Appl. No.: 680,824

[22] Filed: Apr. 28, 1976

[51] Int. Cl.$^2$ .............................................. C02C 1/14
[52] U.S. Cl. ................................... 210/440; 210/450; 55/502; 277/235 R; 277/184; 285/331; 285/DIG. 11; 220/357; 220/378; 292/307 R
[58] Field of Search ................................ 210/440–445, 210/450; 55/502; 220/357, 358, 378; 285/331, DIG. 11; 277/166, 184, 235, 189; 292/307 R

[56] References Cited

U.S. PATENT DOCUMENTS

| | | | |
|---|---|---|---|
| 1,518,521 | 12/1924 | Kraft | 277/235 |
| 1,931,922 | 10/1933 | Damsel et al. | 285/DIG. 11 |
| 2,457,122 | 12/1948 | Burley | 210/492 |
| 2,506,687 | 5/1950 | Scherrer | 285/331 |

FOREIGN PATENT DOCUMENTS

| | | | |
|---|---|---|---|
| 52,584 | 5/1966 | Germany | 285/331 |
| 2,302,877 | 8/1973 | Germany | 277/235 |

*Primary Examiner*—Frank W. Lutter
*Assistant Examiner*—David L. Lacey
*Attorney, Agent, or Firm*—Phillips, Moore, Weissenberger, Lempio & Majestic

[57] ABSTRACT

A filter assembly comprises a base having a cartridge-type filter and an impervious case mounted thereon. An open end of the case is disposed in an annular recess defined in the base. An annular sealing means is disposed within the recess and is compressed in sealing relationship therein by the case. The sealing means comprises an annular metallic insert having a U-shaped cross section and an annular elastomeric member molded as an integral part thereof. Outer sealing portions of the elastomeric member are compressed into sealing contact with top and sidewalls defining the recess and the case is automatically self-centered within sidewalls of the insert.

17 Claims, 4 Drawing Figures

SEAL FOR CARTRIDGE-TYPE FILTER ASSEMBLIES

BACKGROUND OF THE INVENTION

The engine employed on a construction vehicle, such as a tractor, has a filter assembly mounted thereon to continuously filter oil during operation of the engine. As shown in FIG. 4 of applicant's drawing, the filter assembly may comprise a base B attached on the engine and a case C, enclosing a cartridge-type filter, mounted on the base. The open end of the case is disposed within an annular recess R formed on the base and a seal S is disposed within the recess and is compressed therein by the case.

Since the wall thickness of the case is less than the width of the recess, the case is oftentimes mounted on the base in an off-center relationship indicated at C' whereby a portion S' of the seal is extruded on one side of the case. Such extrusion gives rise to obvious sealing problems and the seal is usually sufficiently deformed and damaged so that it cannot be reused. In addition, upon replacement of the filter, a tool must be used to scrape the remnants of seal S out of recess R which not only increases service time but also damages the sealing surfaces defined by the recess.

SUMMARY OF THIS INVENTION

An object of this invention is to overcome the above, briefly described problems by providing an economical and reusable sealing means for filter assemblies which exhibits sealing and self-centering desiderata hereinafter more fully explained.

The seal is particularly adapted for use in a filter assembly comprising a base defining an annular recess therein and a filter and enclosing case mounted on the base. The annular sealing means is disposed within the recess for automatically centering an open end of the case therein and for also applying substantially equal sealing pressures against bottom and sidewalls defining the recess.

The sealing means preferably comprises an annular metallic insert, having a generally U-shaped cross section, defining a top wall and a pair of sidewalls connected thereto. An annular elastomeric member is molded as an integral part of the insert and comprises an outer sealing portion disposed exteriorly on the top and sidewalls of the insert to define three contiguous sealing surfaces adapted to intimately contact the wall portions defining the recess. The sealing means also preferably has a plurality of slots formed through the sidewalls thereof which are adapted to be engaged by a tool for removal purposes.

BRIEF DESCRIPTION OF THE DRAWING

Other objects of this invention will become apparent from the following description and accompanying drawing wherein.

DETAILED DESCRIPTION

Figure 1:
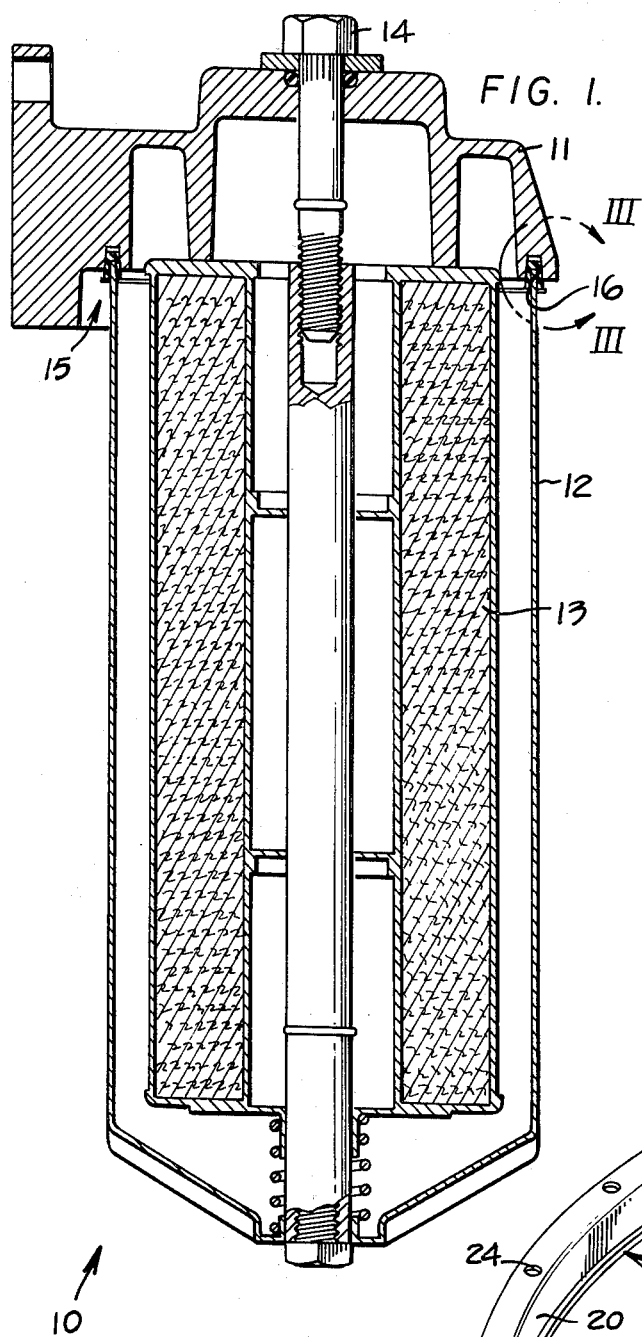
FIG. 1 is a longitudinal sectional view of a filter assembly employing the sealing means of this invention therein.

FIG. 1 illustrates a filter assembly 10 comprising a base 11 adapted to be mounted on an internal combustion engine, for example. The filter is adapted to function in a conventional manner whereby crankcase oil is circulated therethrough to remove wear products and the like from the oil. The filter assembly further comprises an impervious case 12 and a cartridge-type filter 13 disposed within the case and releasably mounted on the base therewith by a bolt 14 in a cnventional manner.

Figure 3:
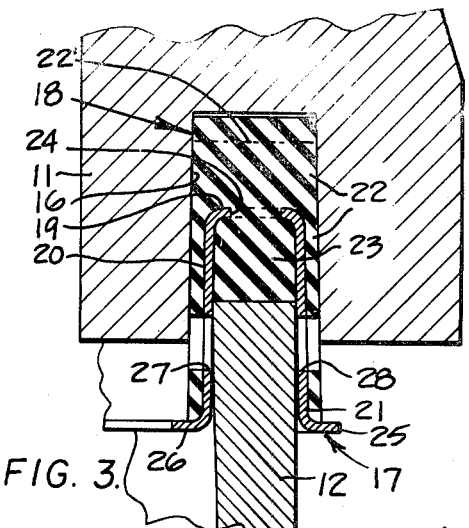
FIG. 3 is an enlarged sectional view of the sealing means, generally taken within circle III—III in FIG. 1.
Figure 2:
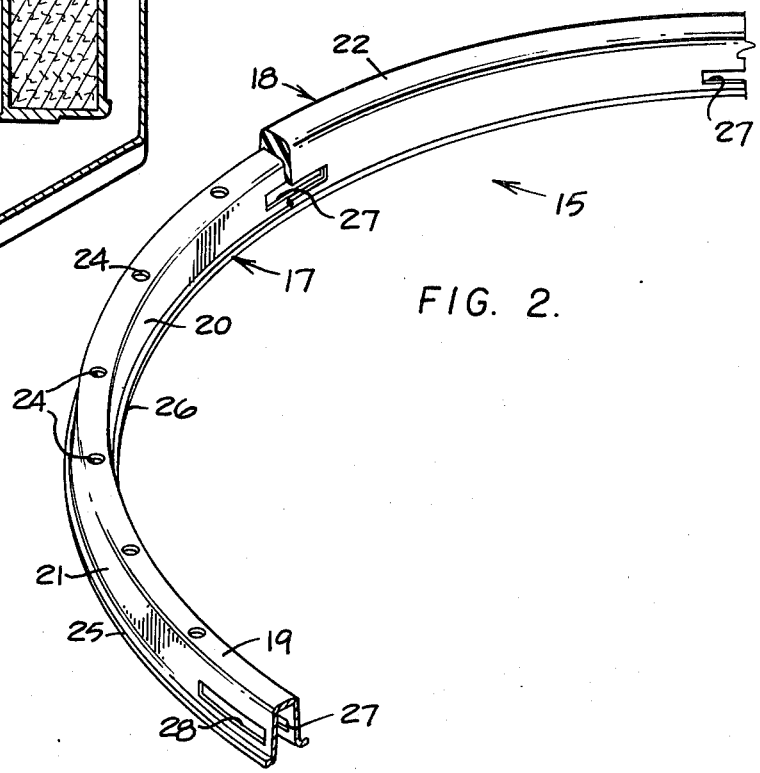
FIG. 2 is an enlarged and partial perspective view of the sealing means.

Referring to FIGS. 2 and 3, this invention relates to an annular sealing means 15 disposed within an annular recess 16 defined on an underside of base 11. As will be hereinafter more fully understood, the annular sealing means functions to automatically center the open end of case 12 therein and also applies substantially equal sealing pressures against the bottom and sidewalls defining recess 16 in the base. The sealing means comprises an annular metallic insert 17 having an annular elastomeric member 18 molded as an integral part thereof.

Insert 17 has a U-shaped cross section defining a generally flat top wall 19 and a pair of sidewalls connected to the top wall to normally extend therefrom in diverging relationship. The sidewalls will thus provide a wedging action upon insertion of the sealing means in recess 16 to aid in providing the above-mentioned equalized sealing pressures within the recess and to also clamp case 12 therebetween. Elastomeric member 18, composed of a standard rubber or plastic based material employed for sealing applications, comprise an outer sealing portion disposed exteriorly on the top 19 and sidewalls 20 and 21 of insert 17 to define three contiguous sealing surfaces thereon.

The elastomeric member further comprises an inner portion 23 disposed within the cavity defined by the top and sidewalls of the insert. A plurality circumferentially spaced apertures 24 are formed through top wall 19 of the insert whereby the inner and outer portions of the elastomeric member are integrally connected to each other during the molding process whereby the composite sealing means is formed. A pair of radial flanges 25 and 26 are integrally formed on the bottom of sidewalls 20 and 21 of the insert, respectively, whereas a plurality of circumferentially disposed and equally spaced slots 27 and 28 are formed through such sidewalls. As shown in FIG. 3, the slots are disposed below inner portion 23 of the elastomeric member and are exposed below base 11.

Upon installation of case 12 and filter 13 on base 11, sealing means 15 is initially disposed in recess 16 with the top portion of the seal being maintained out of contact with the bottom wall of the recess, as indicated at 22'. Upon tightening of bolt 14, case 12 will be drawn further into the recess to compress the three contiguous and outer sealing surfaces of elastomeric member 18 into sealing contact within the recess. Simultaneously therewith, normally diverging sidewalls 20 and 21 of the insert will tend to provide a wedging function in the recess whereby the case is clamped therebetween, i.e., the wall thickness of the case substantially equals the distance between inner surface portions of the sidewalls.

Upon servicing of the filter assembly for filter replacement purposes, bolt 14 is removed to thus permit removal of the case and filter from base 11. Although sealing means 15 could remain within recess 16 prior to the reinstallation of the case and a new filter thereon, the sealing means may be removed from the base for cleaning purpose. In particular, the workman need only insert a screw driver through apertures 27 and 28, also formed through outer sealing portion 22 of elastomeric member 18, to release the sealing means from the recess.

Figure 4:
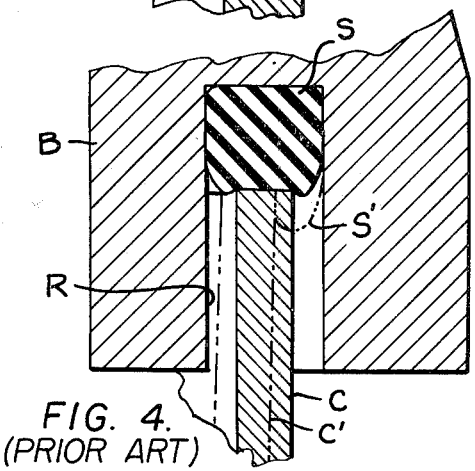
FIG. 4 is a view similar to FIG. 3, but illustrating a prior art seal mounted in a filter assembly of the type generally illustrated in FIG. 1.

As briefly discussed above, FIG. 4 disclosed a prior art seal S which gives rise to sealing and filter replacement problems. Regarding the sealing problem, it should be noted that even the slightest off-center relationship of case C within recess R, as indicated at C', would tend to extrude a portion S' of the seal to effect a non-uniform sealing pressure in the recess. In addition, oil pressures within the filter may tend to effect further extrusion of the seal to increase the sealing problem.

Thus, upon replacement of the filter the seal must be discarded and a new one reset in recess R. The workmen must also spend some time in scraping remnants of the old seal from the recess. Such scraping could cause indentations on the wall portions of the base defining recess R which would further increase the sealing problem thereat.

What is claimed is:

1. A filter assembly having an inlet and an outlet comprising
    a base having an annular recess defined therein, said recess being generally U-shaped in cross section and defined by a bottom wall and a pair of sidewalls,
    a filter mounted on said base and disposed within the confines of said recess,
    a substantially impervious case having an open end mounted at said recess on said base, said filter disposed within said case, and
    annular sealing means disposed within said recess, between said base and the open end of said case, for automatically centering the open end of said case therein and for applying substantially equal sealing pressures against the bottom and sidewalls defining said recess.

2. The filter assembly of claim 1 wherein said sealing means comprises an annular metallic insert having a generally U-shaped cross section and an annular elastomeric member molded as an integral part of said insert.

3. The filter assembly of claim 2 wherein said insert comprises a top wall and a pair of sidewalls connected thereto to normally diverge slightly away from each other, away from said top wall.

4. The filter assembly of claim 3 wherein said elastomeric member comprises an outer sealing portion disposed exteriorly on the top and sidewalls of said insert to define three contiguous sealing surfaces for applying said substantially equal sealing pressures against the bottom and sidewalls defining said recess.

5. The filter assembly of claim 4 further comprising a plurality of apertures formed through the top wall of said insert and wherein said elastomeric member further comprises an inner portion disposed within a cavity defined within said insert and integrally connected to the outer sealing portion thereof through said apertures.

6. The filter assembly of claim 3 wherein said insert further comprises a flange secured to a lower end of each of said sidewalls to extend outwardly away from the flange formed on the lower end of the other one of said sidewalls.

7. The filter assembly of claim 3 wherein the open end of said case is clamped between the sidewalls of said insert with the wall thickness of said case substantially equalling the distance between inner surface portions of said sidewalls.

8. The filter assembly of claim 2 further comprising means defining a plurality of circumferentially disposed slots through at least one of the sidewalls of said insert, said slots being at least partially exposed relative to said base.

9. The filter assembly of claim 8 wherein a plurality of said slots are formed through each of said sidewalls.

10. The filter assembly of claim 8 wherein said elastomeric member further comprises an inner portion disposed within said insert and wherein said slots are positioned in exposed relationship below said inner portion.

11. A composite annular sealing means disposed in a horizontally disposed plane and adapted for use in filter assemblies and the like comprising;
    an annular metallic insert having a generally U-shaped cross section throughout the entire circumferential length thereof and defining an annular top wall disposed in parallel relationship relative to said plane and a pair of radially spaced sidewalls disposed at different radial distances from a center of said insert and connected to said top wall and disposed in at least generally perpendicular relationship relative to said plane,
    an annular elastomeric member, molded as an integral part of said insert, comprising an outer sealing portion disposed exteriorly on said top and sidewalls to define three contiguous sealing surfaces and a plurality of circumferentially disposed slots formed through at least one of the sidewalls of said insert and said elastomeric member.

12. The sealing means of claim 11 further comprising a plurality of apertures formed through said insert and wherein said elastomeric member further comprises an inner portion disposed within a cavity defined by the top and sidewalls of said insert and integrally connected to said outer sealing portion through said apertures.

13. The sealing means of claim 12 wherein said apertures are formed through the top wall of said insert.

14. The sealing means of claim 11 wherein a plurality of said slots are formed through each of the sidewalls of said insert.

15. The sealing means of claim 14 wherein said slots are substantially equally spaced circumferentially about the sidewalls of said insert.

16. The sealing means of claim 11 further comprising a flange secured to a lower end of each of said sidewalls to extend circumferentially outwardly away from the flange formed on the lower end of the other one of said sidewalls and underlying the outer sealing portion disposed exteriorly on a respective one of said sidewalls.

17. A composite annular sealing means adapted for use in filter assemblies and the like comprising
    an annular metallic insert having a generally U-shaped cross section defining a top wall and a pair of sidewalls connected thereto,
    an annular elastomeric member, molded as an integral part of said insert, comprising an outer sealing portion disposed exteriorly on said top and sidewalls to define three contiguous sealing surfaces and
    a plurality of circumferentially disposed slots formed through at least one of the sidewalls of said insert and said elastomeric member.

* * * * *